United States Patent [19]
Stetson et al.

[11] 4,369,348
[45] Jan. 18, 1983

[54] METHOD AND APPARATUS FOR HIGH FREQUENCY OPTICAL BEAM OSCILLATION

[75] Inventors: Karl A. Stetson, Coventry; Conrad M. Banas, Bolton, both of Conn.

[73] Assignee: United Technologies Corporation, Hartford, Conn.

[21] Appl. No.: 186,867

[22] Filed: Sep. 12, 1980

Related U.S. Application Data

[62] Division of Ser. No. 1,101, Jan. 4, 1979.

[51] Int. Cl.³ .............................................. B23K 27/00
[52] U.S. Cl. ........................ 219/121 LP; 219/121 LM; 350/6.6
[58] Field of Search ................ 219/121 LW, 121 LX, 219/121 L, 121 LM, 121 LA, 121 LB, 121 LC, 121 LD, 121 LP; 350/6.6, 288

[56] References Cited

U.S. PATENT DOCUMENTS

| | | | |
|---|---|---|---|
| 3,386,786 | 6/1968 | Kaisler et al. | 250/235 |
| 3,794,410 | 2/1974 | Elliott | 350/285 |
| 3,848,104 | 11/1974 | Locke | 219/121 LW |
| 3,888,562 | 6/1975 | Rushing et al. | 350/6.6 |
| 3,981,566 | 9/1976 | Frank et al. | 350/615 |
| 3,985,420 | 10/1976 | Grose | 350/7 |
| 4,084,188 | 4/1978 | Gorog et al. | 358/199 |

FOREIGN PATENT DOCUMENTS 52-55098 5/1977 Japan .................. 219/121 LW
558247 5/1977 U.S.S.R. ............... 350/6.6

OTHER PUBLICATIONS

J. M. Fleischer, "Piezoceramic Deflector", *IBM Technical Disclosure Bulletin*, vol. 13, No. 6, pp. 1648–1649, Nov. 1970.

*Primary Examiner*—C. L. Albritton
*Attorney, Agent, or Firm*—M. P. Williams

[57] ABSTRACT

A mechanical scanning apparatus adapted for oscillating the focus zone of a beam of radiation having high power to modify and control the nature and extent of the interaction zone on a workpiece is disclosed. The apparatus includes a compound beam adapted for being vibrated in a vibratory mode resulting in oscillatory motion of at least a first end of the compound beam; a reflective surface attached to the first end of the compound beam and adapted for focussing radiation incident thereon to a focus zone, and means for vibrating the compound beam to induce oscillatory motion of the reflective surface resulting in oscillatory motion of the focus zone. For vibration frequencies greater than the characteristic thermal response time of the workpiece material, the effect is a broadening of the interaction zone with a beam-material interaction characteristic of a reduced incident average power intensity while maintaining a high local intensity essential to the establishment of effective radiation-material coupling.

3 Claims, 8 Drawing Figures

METHOD AND APPARATUS FOR HIGH FREQUENCY OPTICAL BEAM OSCILLATION

This is a continuation of application Ser. No. 1,101 filed on Jan. 4, 1979.

BACKGROUND OF THE INVENTION

The present invention is related to laser beam focussing devices and more particularly to an apparatus adapted for focussing and time averaging the intensity distribution of a beam of radiation on a workpiece at high frequency.

Material processing applications typically require rapid, controlled scanning of a focussed beam of high power radiation over a surface of a workpiece. The rapid, controlled scanning of the radiation is required to reduce the average intensity of the beam energy input onto the workpiece while maintaining a high instantaneous intensity of radiation at the interaction zone to promote effective coupling of the radiation with the workpiece. In a typical example utilizing high power radiation from a carbon dioxide laser for welding aluminum, an incident power density of approximately $5 \times 10^6$ watts per square centimeter is required to overcome the initially high surface reflectivity of the aluminum material and to establish a deep penetration welding condition therein. Once the deep penetration welding condition has been established, however, the efficiency of energy coupling increases dramatically. The increased energy absorption together with the relatively modest energy requirements for fusing aluminum (due to low density and melting point) lead to substantial overheating of the weld zone. In addition to causing sporadic vaporization and material expulsion, the high molten material temperature promotes hydrogen solubility and resultant weld porosity.

Davis et al. in U.S. patent application Ser. No. 209,940 filed Nov. 2, 1980, a continuation of Ser. No. 1,038, now abandoned, and held with the present application by a common assignee, discloses a mechanical rotating apparatus adapted for rotating a beam of radiation about its propagation axis to effectively time average the azimuthal intensity distribution of the radiation incident on a workpiece. The beam undergoes multiple reflections within the apparatus such that the beam rotates at twice the rotation frequency of the apparatus. Displacing the beam exiting the rotating apparatus from the rotation axis effectively time averages the azimuthal and radial intensity distribution. This unit, however, does not adapt to moving the focussed spot and is limited to the frequencies reasonably attainable by mechanical rotation.

Another method of time averaging the intensity distribution of a high power beam of radiation is to oscillate the beam across the beam-radiation interaction zone. This method has been clearly demonstrated in electron beam technology wherein electron beams due to their electric charge can be readily scanned at high frequency over an interaction zone with electric or magnetic means. Electrooptical and mechanical scanning means are available for low frequency oscillation of a beam of laser radiation having low power. However, low frequency oscillation of the beam to obtain time averaging of the intensity distribution is inadequate for most laser welding applications since the interaction time of the material is more rapid than the time required to scan the beam across a weld zone. Under such conditions a narrow, spiral weld bead will be formed rather than the desirable broadened, linear bead.

To obtain effective time averaging of the intensity distribution for welding purposes, the beam must be oscillated across the weld zone in a time short compared to the characteristic thermal conduction time of molten metal such that the reaction of the material with the radiation is characterized by the interaction of a beam having an intensity averaged distribution with the material. For aluminum material this typically requires oscillating the beam at a frequency in excess of one thousand hertz.

Prior art techniques of oscillating a beam of high power radiation at high frequencies are not suitable. Laser mirrors adapted for focussing high power radiation typically have substantial bulk and/or require cooling. Direct mechanical oscillation of these optical elements at frequencies of one thousand hertz or greater requires prohibitive driving forces. The present invention discloses an apparatus obviating this difficulty.

SUMMARY OF THE INVENTION

A primary object of the present invention is to provide a focussed beam of radiation having a reduced time average intensity distribution incident on a workpiece while maintaining the high instantaneous intensity essential for effective coupling with a workpiece.

In accordance with the present invention a method for providing a focussed beam of radiation having a time average intensity distribution includes use of a compound beam adapted for vibration about a centerline axis having a shaft longitudinally disposed about the centerline axis, a first end member fixedly attached to one end of the shaft, and a second end member fixedly attached to the other end of the shaft, wherein the second end member is adapted for receiving energy to induce and sustain vibratory motion of the compound beam, means disposed proximate the second end for inducing vibratory motion in the compound beam, and means attached to the first end member for focussing a beam of radiation.

A primary feature of the present invention is scanning of a reflective surface adapted for focussing a beam of radiation incident thereon to a focus zone wherein the reflective surface is attached to one end of the compound beam.

The vibratory motion of the first end member in the first direction results in the focus zone oscillating in a first line scan while vibratory motion in the second direction results in the focus zone oscillating in a second line scan wherein the first line scan is orthogonal to the second line scan. Additionally the two pairs of electromagnetic drivers are capable of operation in phase quadrature to produce a circular scan of the focus zone. Varying the amplitude and time phase of the signals on the two pairs of electromagnetic drivers allows the creation of an elliptical scan of the focus zone in any orientation and eccentricity.

A primary advantage of the present invention is the high frequency oscillation of the focus zone of laser radiation for time averaging the intensity distribution of radiation incident onto a workpiece. Additionally, since the compound beam is vibrated at a natural frequency, the amount of energy required to induce the compound beam to vibrate at a high frequency is minimized. Also, the unitary construction of the preferred embodiment eliminates energy losses at the component interfaces. A compound beam formed with discrete elements can be configured to achieve a low mass of the compound beam to obtain a high frequency fundamental vibratory mode while utilizing high strength shaft material for mechanical integrity (in particular fatique endurance). The compound beam is capable of being vibrated at a frequency sufficiently high such that the focus zone of the radiation oscillates at a frequency greater than the characteristic thermal response time of the material of a workpiece.

The foregoing and other objects, features and advantages of the present invention will become more apparent in the light of the following detailed description of preferred embodiments thereof as discussed and illustrated in the accompanying drawing.

DESCRIPTION OF THE PREFERRED EMBODIMENT

Figure 1:
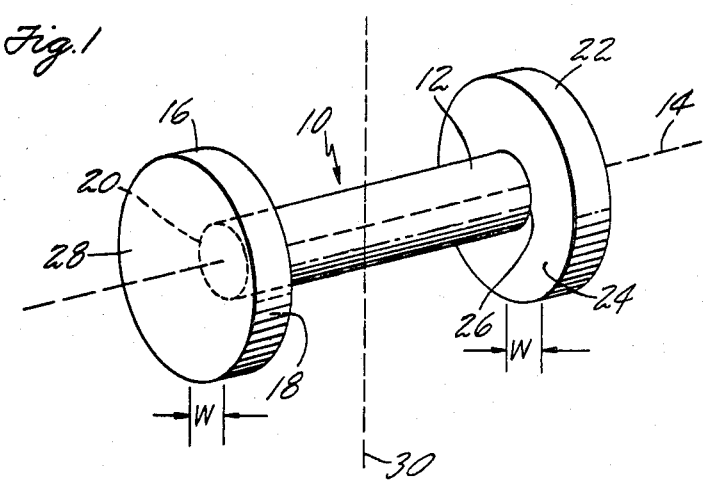
FIG. 1 is a simplified perspective view of a representative compound beam utilized in the present invention.

Referring now to FIG. 1 which shows a simplified perspective view of a compound beam 10 adapted for time averaging a focussed beam of radiation in accordance with the present invention. The compound beam includes a shaft 12 longitudinally disposed about a centerline axis 14, a first disk 16 having a first side 18 fixedly attached to a first end 20 of the shaft and a second disk 22 having a first side 24 fixedly attached to the second end 26 of the shaft. The first and second disks and the shaft are all symmetrically disposed about the centerline axis. The first disk 16 has a reflective surface 28 having a radius of curvature R adapted for focussing a beam of radiation incident thereon to a focal zone as hereinafter described. In the preferred embodiment the compound beam 10 has a unitary structure formed from a single piece of material thereby eliminating energy losses at the material interfaces. The width W of the first and second disks 16, 22 are substantially the same for balancing the compound beam around the centerline axis 14 and a vertical axis 30 through the shaft substantially in the center between the first and second disks.

Figure 2:
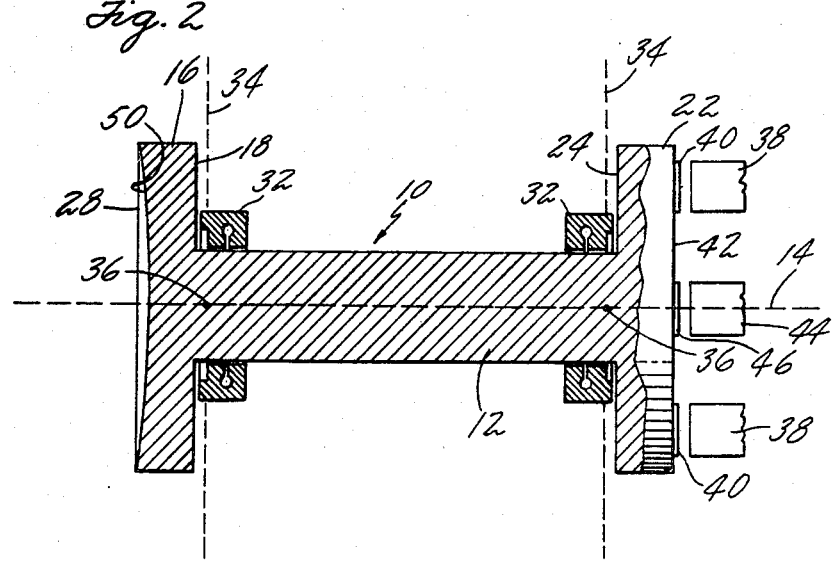
FIG. 2 is a simplified cross-sectional view of the compound beam shown in FIG. 1 in accordance with the present invention.

Referring now to FIG. 2 which shows a simplified cross-sectional view of the present invention wherein the compound beam 10 is supported by bearings 32, such as air bearings, disposed about the shaft 12 proximate the first side 18 of the first disk 16 and proximate the first side 24 of the second disk 22. The bearings are positioned within planes 34 perpendicularly disposed to the centerline axis 14 and passing through nodal positions 36 as more fully described hereinafter. A first pair of noncontacting electromagnetic drivers 38 positioned symmetrically about the centerline axis in a spaced apart relation with the second disk is adapted for providing electromagnetic energy to a first pair of drive plates 40 formed from high magnetic permeability material such as μ metal and fixedly attached to a second side 42 of the second disk. The first pair of drive plates is diametrically positioned on the second disk as more fully shown in FIG. 3 in a spaced apart relation with the first pair of electromagnetic drivers 38 and in alignment therewith. A second pair of non-contacting electromagnetic drivers 44 positioned symmetrically about the centerline axis in a spaced apart relationship with the second disk and in an orthogonal relationship to the first pair of electromagnetic drivers is adapted for providing electromagnetic energy to a second pair of drive plates 46 fixedly attached to the second disk. The second drive plates are diametrically positioned on the second disk, in an orthogonal relationship to the first pair of drive plates, in a spaced apart relation with the second pair of electromagnetic drivers and in alignment therewith. The drive plates are preferably small plates having high magnetic permeability which are fixedly attached to the second surface of the second disk. It is to be recognized that the first and second pair of drive plates may be replaced with a ring of high magnetic permeability material. It is also to be recognized that the entire second disk may be made of material having high magnetic permeability.

Referring again to FIG. 2, the first disk 16 includes a second end 50 which has been configured to have a radius of curvature R adapted for focussing a beam of radiation incident thereon to a focus zone and is optically polished to form the reflective surface 28. In the preferred embodiment the reflective surface is formed integral with the first disk. It is to be recognized that a mirror having the desired radius of curvature may be fixedly attached to the first disk to form the reflective surface.

In the preferred embodiment the compound beam 10 is dimensioned to vibrate in the lowerst order fundamental mode to minimize the excitation energy required to initiate and sustain the vibration. The approximate dimensions of the compound beam i.e., the thickness and length of the shaft, the thickness and diameter of the first and second disks and the material of the disks required to provide a desired fundamental lateral vibration frequency, are initially determined from known relationships for vibrating beams and appropriate adjustment in the size or mass is made by successive iterations by the removal or addition of material to obtain an exact value. The compound disk 10 and the bearings 32 are preferably tuned to be symmetrical in a circular sense such that the compound beam has no preferred direction of vibration and is adapted for vibrating substantially equally in any lateral direction at the same natural frequency. The bearings 32 are positioned along the longitudinal length of the shaft 12 at the nodal positions 36 corresponding to the lowest order fundamental mode of vibration and are adapted for inhibiting lateral, axial and rotary motion of the compound beam. The bearings apply restraining forces to both the shaft and the first surfaces of the first and second disk respectively.

Figure 4:
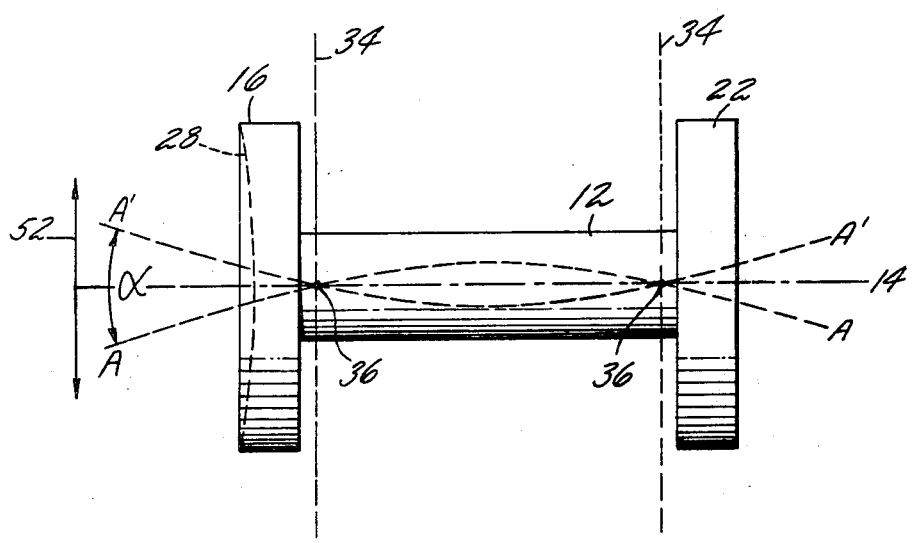
FIG. 4 is a simplified cross-sectional view of the present invention vibrating in a fundamental mode.

Referring now to FIG. 4 wherein the compound beam is schematically shown vibrating in the lowest order fundamental mode having nodal points 36 along the centerline axis 14. In the fundamental mode of oscillation the first and second disks move in one direction while the shaft 12 moves in the opposite direction. Thus vibrational momentum is balanced and the vibrating system is nearly energy conservative. In operation, vibratory signals, typically frequency tuned to the fundamental vibratory mode of the compound beam, are applied to the first pair of electromagnetic drivers 38, in opposite phase to one another as push-pull signals to induce the compound beam to vibrate in the fundamental mode. The extremes of the vibratory motion are shown by the lines A and A' in FIG. 4. It is to be recognized that the separation between the extremes has been exaggerated in FIG. 4 for illustrative purposes. The push-pull signals induce lateral vibration motion of the compound beam in a first direction as shown by the arrows 52. During this vibration both end disks rotate through an angle $\alpha$ having a center of rotation at the nodal positions 36. In the preferred embodiment the compound beam is dimensioned to have nodal positions close to the first and second disks to minimize lateral movement of said disks during vibration.

Figure 3:
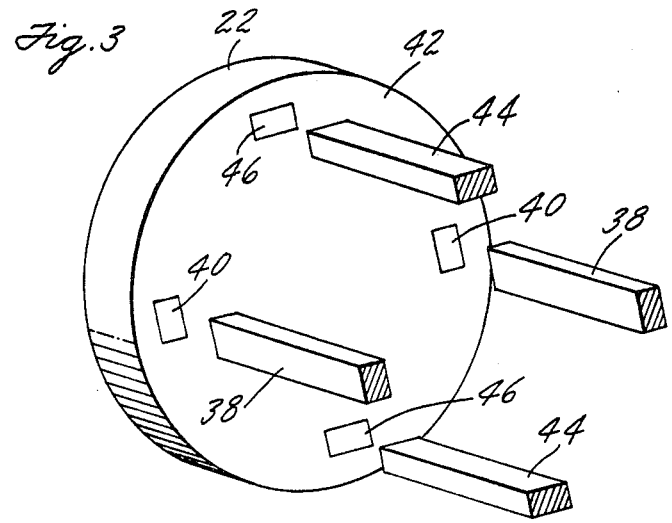
FIG. 3 is a simplified perspective view of one end of the present invention showing the means for inducing vibratory motion into a compound beam.

It is to be recognized that applying vibratory signals at the frequency tuned to the fundamental mode to the second pair of electromagnetic drivers 44, as shown in FIG. 3 when operating in the push-pull mode will result in vibratory motion of the compound beam in a second direction orthogonal to the first direction wherein the first and second directions are essentially orthogonal to the centerline axis 14.

Figure 5:
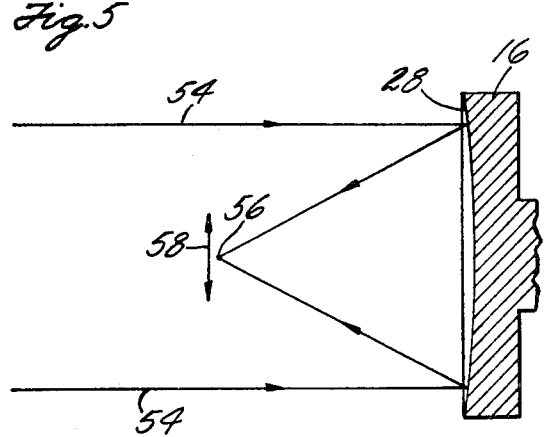
FIG. 5 is a simplified schematic of the motion of a focus zone of the radiation when the component of FIG. 1 is vibrated as shown in FIG. 4.

Referring now to FIG. 5 wherein a beam or radiation 54 from a source (not shown) is directed to the reflective surface 28 on the first disk 16 and is focussed to a focus zone 56. For the vibratory oscillation as shown pictorially in FIG. 4, the reflective surface 28 rotates through the angle $\alpha$ thereby moving the position of the focus zone in a first direction, as shown by the arrows 58 in FIG. 5, producing a substantially line motion of the focus zone. It is to be recognized that if the vibratory motion of the compound beam is induced by the second pair of electromagnetic drivers 44 as shown in FIG. 3, the focus zone 56 as shown in FIG. 5 will move in a second direction producing a substantially line motion of the focus zone wherein the first direction is orthogonal on the second direction. If signals of equal strength are applied to both pairs of electromagnetic drivers and the signals are at ninety degree time phase, then the two vibratory oscillations of the compound beam will be put into phase quadrature and a beam of radiation reflected from the end mirror and brought to a focus will then trace out a circle. Varying the amplitude and time phase of the two signals allows creation of an elliptical path to the focus zone of any orientation and eccentricity.

Since the drive energy input from the first or second pair of electromagnetic drivers is matched to the natural vibrating frequency of the system, damping losses are minimized and large amplitude mirror oscillations are possible with relatively low energy inputs. In a typical application a compound beam operating at one thousand six hundred eighty hertz can provide peak-to-peak amplitude excursions on the order of ten millimeters at the focal zone of the reflective surface having a one-half meter focal length with an oscillatory power input of the order of ten watts.

It is to be recognized that since high frequency oscillation of the reflective surface is desirable, the general design guidelines of the compound beam are such that the shaft have a high shaft stiffness, i.e., a large shaft diameter and a short shaft length and that the first and second disks have a low mass. If the compound beam is constructed from discrete elements, a combination of materials can be used to advantage to achieve the desired characteristics, for example, having a shaft of steel alloy material and the first and second disks formed with aluminum material.

Figure 6:
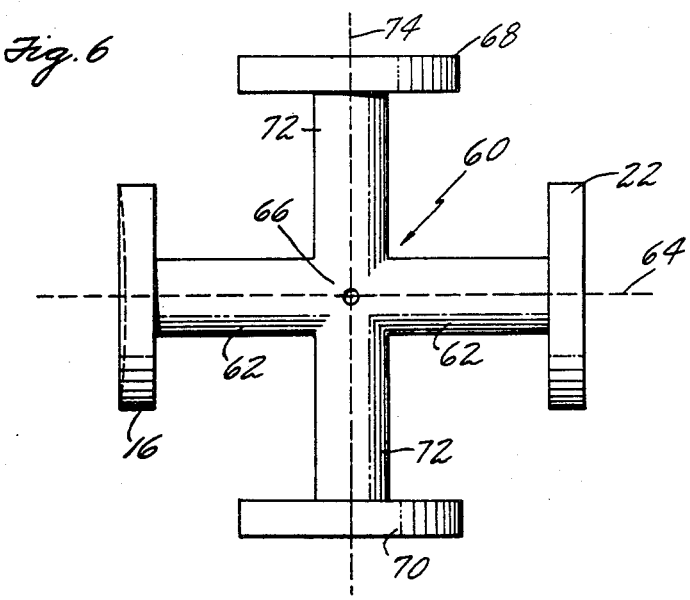
FIG. 6 is a simplified cross-sectional view of an embodiment of the present invention.

Referring now to FIG. 6 which shows an embodiment of the present invention wherein the compound beam has a cruciform shaft 60 with the first disk 16 and the second disk 22 as hereinbefore described fixedly attached to the first legs 62 symmetrically disposed about a first axis 64 and joined together at the center portion 66 of the cruciform shaft, a third disk 68 and a fourth disk 70, both substantially identical to the second disk, fixedly attached at opposite ends of second legs 72 symmetrically disposed about a second axis 74 joined together at the central portion 66 of the cruciform shaft in an orthogonal relationship to the first legs. The first and second legs lie in a plane passing through the first and second axis 64, 74 respectively. The central portion of the cruciform shaft is fixedly attached to a rigid support (not shown) for restraining the compound beam from lateral, axial and rotary motion. This embodiment eliminates the requirement of the bearing 32 as shown in FIG. 2. The first and second pair of electromagnetic drivers 38, 44 and the first and second pair of drive plates may be positioned on the second disk as shown in FIG. 3 or may be positioned on the third and fourth disks in like manner. It is to be noted that the first pair of electromagnetic drivers may be positioned proximate the second disk and the second pair of electromagnetic drivers may be positioned proximate the third or fourth disk.

Figure 7B:
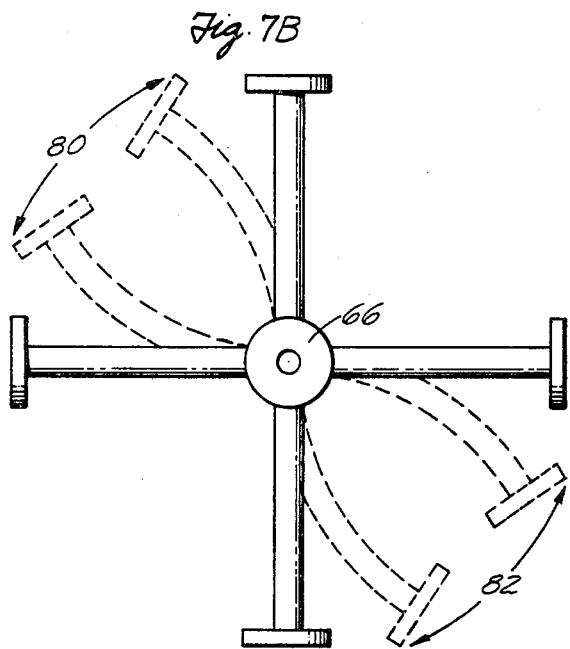
FIGS. 7A and B are simplified views of two possible vibration modes of the apparatus as shown in FIG. 6.
Figure 7A:
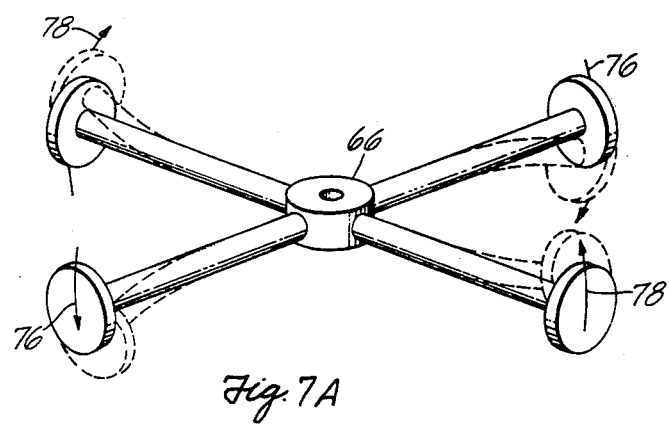

A fundamental vibratory mode of the cruciform shaft is shown in FIG. 7A wherein the center of the cruciform shaft remains stationary and the first and second disks vibrate substantially out of phase with the third and fourth disks resulting in zero angular momentum of the cruciform shaft. As shown in FIG. 7A, as the first and second disks vibrate in the negative direction as shown by the arrow 76 the third and fourth disk move in the positive direction as shown by the arrow 78.

A second fundamental mode is shown in FIG. 7B wherein the cruciform shaft vibrates substantially in a plane passing through the first and second axis 64, 74 respectively as shown in FIG. 6 wherein as the separation between the first and fourth disk (16, 68 as shown in FIG. 6), as shown by the arrows 80 decreases, the separation between the second and third disk also decreases. The cruciform shaft is adapted for providing line scans and curvilinear scans of the focus zone in a manner similar to the scans produced by the compound beam 10 as hereinbefore described. It is to be recognized that the configuration of the compound beam is not limited to the embodiments as shown and described but may have any configuration adapted for vibrating a reflective surface to provide oscillatory motion of a focussed beam on a workpiece.

In operation, the oscillatory motion of the focus zone results in broadening of the interaction zone with a radiation-material interaction characteristic of a reduced incident average power intensity while maintaining a high local intensity incident on the workpiece which is essential to the establishment of effective radiation-material coupling of the incident radiation. The reduced effective intensity is capable of providing a broader weld zone thereby decreasing seam tracking requirements. Additionally the reduced effective intensity results in a reduced molten zone temperature with a corresponding reduction in weld defects and permits the welding operation to be conducted with a higher energy input per unit weld length resulting in a decrease in the weld cooling rate which is desirable for welding some alloy steels and permits the utilization of greater additions of filler material for bridging larger gaps. Also the oscillation of the focussed spot promotes weld pool stirring which provides a more effective means for expulsion of evolved gases in the molten material and the generation of higher quality weldments. It is to be recognized that the oscillation frequency of the focus zone over the interaction area of the workpiece must be greater than the characteristic time of the interaction process to obtain a useful time averaging of the intensity distribution.

Although the preferred embodiment utilizes a noncontacting electromagnetic means for inducing the compound beam to vibrate, it is to be recognized that contacting means may also be employed to induce the compound beam to vibrate such that at least the reflective undergoes vibratory motion suitable for sweeping the focus zone of the radiation across the interaction area of a workpiece.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A method of time averaging the intensity distribution of a focussed beam of radiation incident onto a workpiece comprising:
    directing a beam of radiation to a reflective surface attached to one end of a compound beam wherein the reflective surface focusses the radiation to a focus zone incident onto a workpiece;
    coupling drive energy into the compound beam to produce vibratory motion therein resulting in the oscillatory motion of the reflective surface attached to one end of the compound beam producing vibratory motion of the focus zone over a radiation-material interaction zone of the workpiece wherein the vibratory motion of the focus zone effectively time averages the interaction of the intensity distribution of the radiation with the workpiece, wherein the drive energy is coupled into the compound beam by first and second pairs of drivers, the drivers in each pair positioned diametrically opposed one another proximate a second end of the compound beam, said second pair of drivers positioned in an orthogonal relationship to said first pair of drivers, operating at a frequency tuned to a fundamental vibratory mode of the compound beam resulting in first and second line scans of the focus zone through the radiation-material interaction zone.

2. The invention in accordance with claim 1 further including operating the first and second drivers in phase quadrature to produce a curvilinear scan of the focus zone over the interaction zone on the workpiece.

3. The invention in accordance with claim 2 further including varying the amplitude and time phase of drive signals on the two pair of drivers to provide an elliptical scan of the focus zone in any orientation and eccentricity over the interaction zone on the workpiece.

* * * * *